United States Patent
Marshall et al.

(10) Patent No.: US 9,436,546 B2
(45) Date of Patent: Sep. 6, 2016

(54) APPARATUS FOR ERROR DETECTION IN MEMORY DEVICES

(71) Applicants: Ray Marshall, Harpenden (GB); Joseph Charles Circello, Phoenix, AZ (US); Wilhard Christophorus Von Wendorff, Munich (DE)

(72) Inventors: Ray Marshall, Harpenden (GB); Joseph Charles Circello, Phoenix, AZ (US); Wilhard Christophorus Von Wendorff, Munich (DE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 207 days.

(21) Appl. No.: 14/258,327

(22) Filed: Apr. 22, 2014

(65) Prior Publication Data

US 2015/0301890 A1   Oct. 22, 2015

(51) Int. Cl.
G11C 29/00    (2006.01)
G06F 11/10    (2006.01)

(52) U.S. Cl.
CPC ................ *G06F 11/1048* (2013.01)

(58) Field of Classification Search
CPC .................................... G06F 11/048
See application file for complete search history.

(56) References Cited

U.S. PATENT DOCUMENTS

| | | | |
|---|---|---|---|
| 6,526,537 B2 | 2/2003 | Kishino | |
| 2006/0117239 A1* | 6/2006 | Lin | G11B 20/00 714/758 |
| 2012/0005559 A1 | 1/2012 | Jeong et al. | |
| 2012/0246542 A1* | 9/2012 | Moyer | G06F 11/1016 714/763 |
| 2013/0117631 A1 | 5/2013 | Gruner et al. | |
| 2013/0262958 A1* | 10/2013 | Ruggiero | G06F 11/10 714/763 |

* cited by examiner

*Primary Examiner* — Sam Rizk

(57) ABSTRACT

The invention relates to an apparatus for transfer of data elements between a bus controller, such as a CPU, and a memory controller. An address translator is arranged to receive a write address from the CPU, to modify the write address and to send the modified write address to the memory controller. An ECC calculator is arranged to receive write input data associated with the write address, from the CPU, and to generate an error correction code on the basis of the write input data. A concatenator is arranged to receive the write input data from the CPU, and to receive the error correction code from the ECC calculator, and to concatenate the write input data and the error correction code to obtain write output data, and to send the write output data to the memory controller.

13 Claims, 9 Drawing Sheets

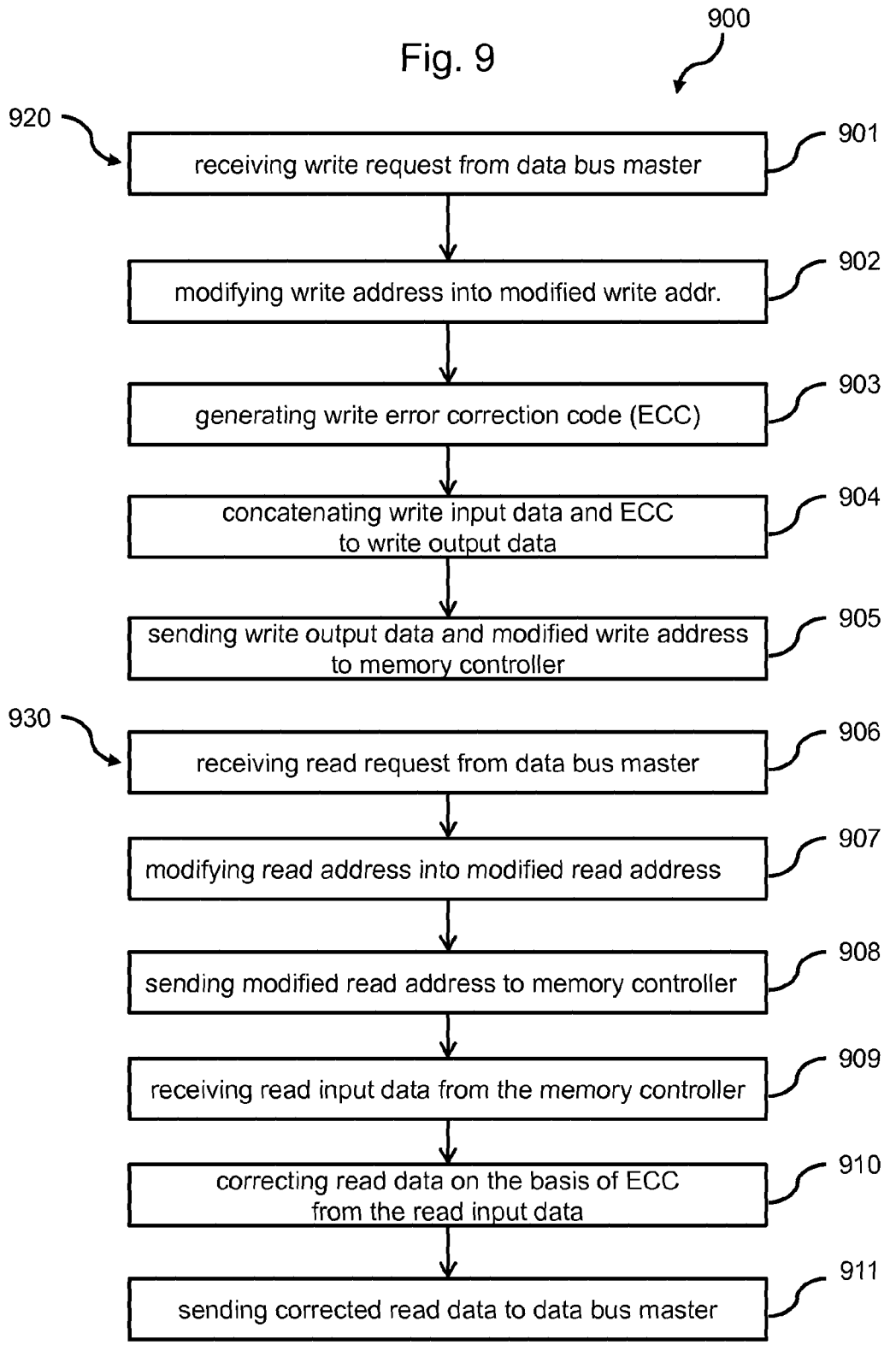

APPARATUS FOR ERROR DETECTION IN MEMORY DEVICES

FIELD OF THE INVENTION

This invention relates to an apparatus for transfer of data elements between a bus master and a memory controller for a memory storage device. It also relates to a data storage interface device for transfer of data elements between a bus master and a memory controller for a memory storage device. It also relates to a method of storing data into a memory device and to a non-transitory computer readable medium.

BACKGROUND OF THE INVENTION

In automotive electronics an increasing number of applications require large amounts of RAM (Random Access Memory), often many megabytes of RAM. The process technologies currently used limit the amount of RAM on chip for practical and economical reasons. A cost effective solution is to use standalone DRAM (Dynamic Random Access Memory) components. In particular, DRAM components used in Personal Computers (PCs) and mobile phones are readily available and cost competitive.

At the same time as memory capacity requirements are increasing, so is the need for increased functional safety. When the electronics module can brake and steer a vehicle without driver intervention, it needs to be 'safe'. Functional safety requires that faults can be quickly and reliably detected. DRAM devices are prone to random changes to the data stored in the device. Functional safety requires that any change to the data in the DRAM device can be detected and, if possible, corrected.

Non-dynamic data in RAM devices which is constant and never expected to change (such as a code image) is simple to test for errors by periodically performing a cyclic redundancy check (CRC) or checksum of the constant data. However, dynamic data, which is constantly changed by the CPU or system, cannot be checked with a CRC or checksum.

A known solution for detecting errors in dynamic data in RAM devices is to perform a simple checksum of each data element (maybe 16 bits, 32 bits or 64 bits) and store the checksum in extra RAM bits associated with each data element. These checksum bits enable detection of an error and what the correct data should be. This is called ECC (Error Correction Coding) and is for instance applicable to correct single bit errors and detect double bit errors. For example, each 32-bit data element requires additionally 7 bits for the ECC checkbits.

US2012/0005559 A1 describes an apparatus and method for managing a DRAM buffer. The DRAM buffer managing apparatus may generate an error correction code (ECC) for data to be written in the DRAM buffer, and may write the data and the ECC bits in the DRAM buffer. An address translation table is used which indicates where in the DRAM buffer, the extra ECC bits are stored.

SUMMARY OF THE INVENTION

The present invention provides an apparatus for transfer of data elements, a data storage interface device for transfer of data elements between a bus master and a memory controller for a memory storage device, a method of storing data into a memory device and to a non-transitory computer readable medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

FIG. 9 schematically shows examples of flow charts of a method of managing data in a memory device.

DETAILED DESCRIPTION OF THE PREFERRED EMBODIMENTS

Figure 1:
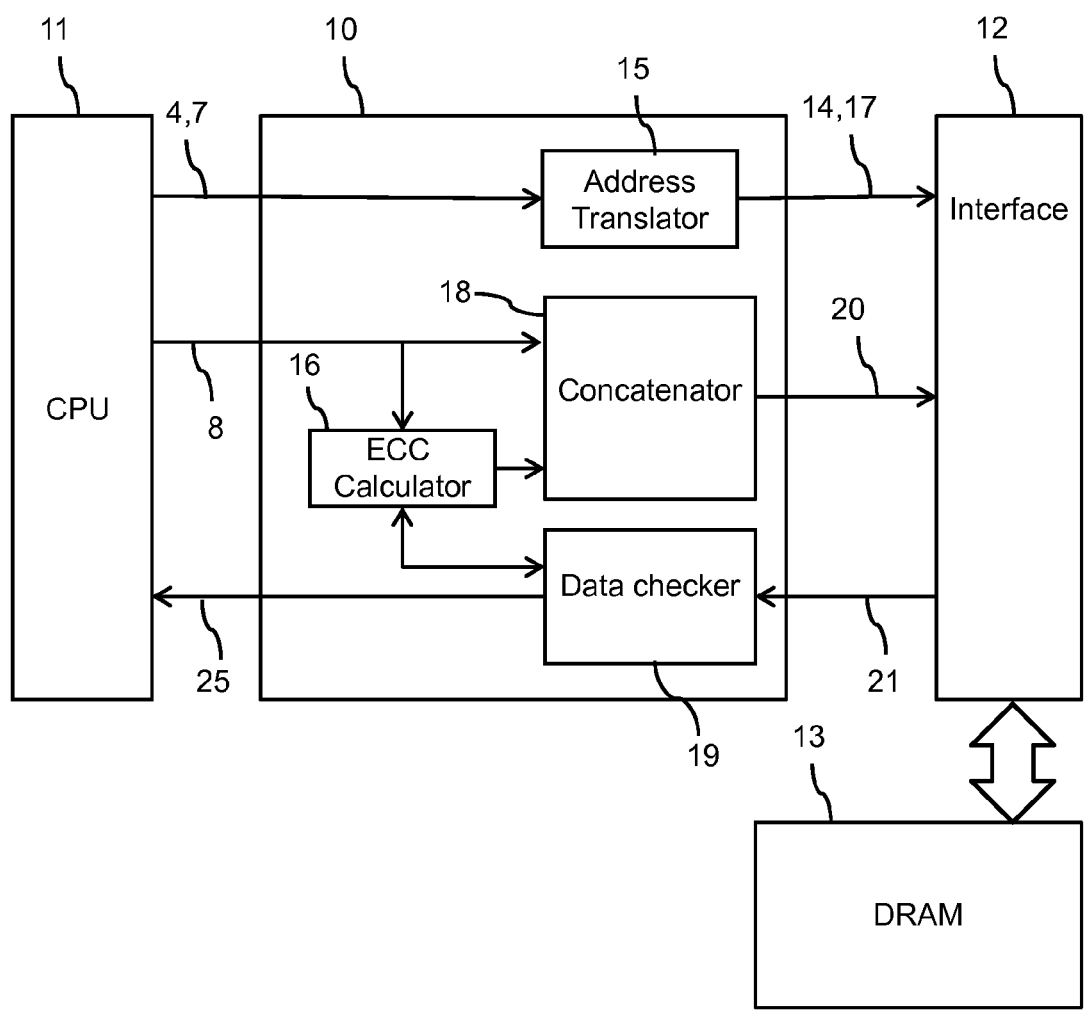
FIG. 1 schematically shows an example of an apparatus for transfer of data elements between a CPU and a DRAM controller.

FIG. 1 schematically shows an example of an apparatus 10 for transfer of data elements between a CPU 11 and a DRAM controller 12. It should be understood that the CPU 11 described with reference to the example of FIG. 1 is one example of a bus master and the present application is not limited thereto. Hence, any component operating as a bus master may store data using the apparatus 10. The DRAM controller 12 interfaces between the apparatus 10 and a DRAM 13. The CPU 11 is enabled to read and write data from/to the DRAM 13.

The apparatus 10 comprises an address translator 15 arranged to receive a write address 4 from the CPU 11 and to modify the write address into a modified write address 14. The address translator 15 is further arranged to send the modified write address 14 to the DRAM controller 12. In case of a read from the DRAM 13, the address translator 15 is arranged to receive a read address 7 from the CPU 11, and to modify the read address into a modified read address 17. The address translator 15 is further arranged to send the modified read address 17 to the DRAM controller 12.

The apparatus 10 further comprises an ECC calculator 16, which is arranged to receive write input data 8 associated with the write address from the CPU 11, and to generate an error correction code using the write input data 8. The apparatus 10 further comprises a concatenator 18 arranged to receive the write input data 8 from the CPU 11 and to receive the error correction code from the ECC calculator 16. The concatenator 18 is arranged to concatenate the write input data 8 and the error correction code to obtain write output data 20 and to send the write output data 20 to the DRAM controller 12. Accordingly, the write input data 8, written by the CPU 11 into the DRAM 13, is provided with and accompanied by the associated ECC, forming the write output data 20. Since ECC is concatenated to the data to be written, more memory space is needed than the CPU 11 is aware of. Translation of a CPU address space into a DRAM address space is performed by the address translator 15 as will be discussed below in more detail.

The apparatus 10 further comprises a data checker 19 arranged to receive read input data 21 associated with the modified read address 17, from the DRAM controller 12. The read input data 21 comprises a data element and an error correction code. The data checker 19 is arranged to correct the data element on-the-fly using the error correction code, to obtain a corrected data element 25, and to send the corrected data element 25 to the CPU 11.

In case of a CPU write the following actions are performed. The write address 4 from the CPU 11 is translated into the modified write address 14 to store a concatenation of the input write data 8 and the write ECC into the DRAM 13. The write ECC is calculated using the input write data 8 and the resulting ECC checkbits are concatenated with the original data, the input write data 8, and written to the DRAM 13 at the modified write address 14.

In case of a CPU read the following actions are performed. The read address 7 from the CPU 11 is translated into the modified read address 17. A concatenation of a data element and the ECC checkbits (also referred to as the read ECC) is read from the DRAM 13 at the modified read address. The extraction may comprise a calculation of an ECC syndrome from the data element and the ECC checkbits of the read concatenation. Based on the resulting ECC syndrome, three possible data states may be indicated: 1) no error detected, 2) a 1-bit error detected, 3) a multi-bit non-correctable error detected. In the case where a 1-bit data error is detected, a corrected data element 25 is generated from the read data element and the ECC syndrome and returned to the CPU 11. It is noted that in case no correction is needed, the data element 25 to be returned to the CPU 11 is the data element of the concatenation, which is read from the DRAM 13, without the ECC checkbits.

Figure 2:
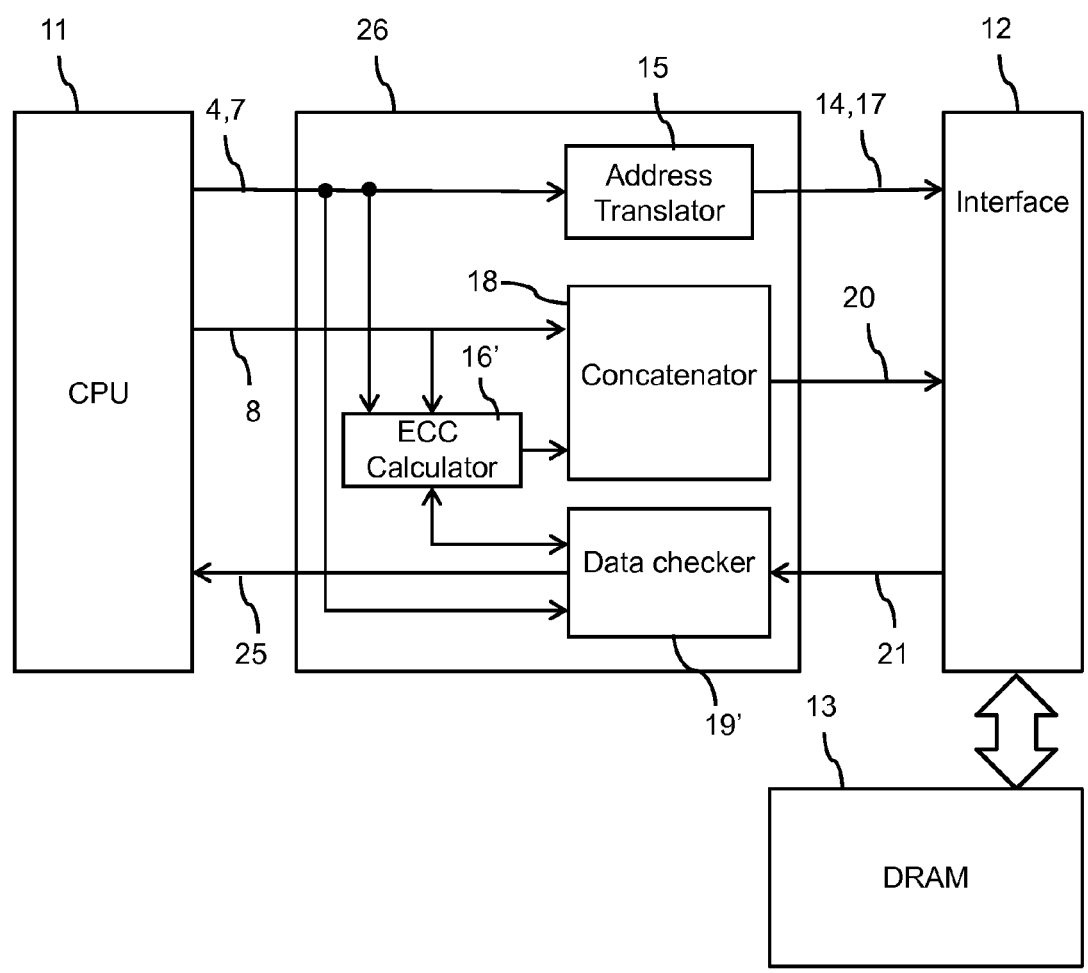
FIG. 2 schematically shows an example of the apparatus.

FIG. 2 schematically shows an example of an embodiment of an apparatus 26 for transfer of data elements between a CPU 11 and a DRAM controller 12. The apparatus 26 differs from the embodiment of FIG. 1 in that it comprises an ECC calculator 16' arranged to receive the write input data 8 associated with the write address from the CPU 11, and to receive the write address 4. The ECC calculator 16' is arranged to generate an error correction code using the write input data plus the write address. So both the write address from the CPU 11, as well as the write input data 8 is used in the ECC calculator 16'.

The apparatus 26 also comprises a data checker 19' arranged to receive the read address 7 and to receive the read input data 21. The read input data comprises a data element and an error correction code. The data checker 19' is arranged to correct the data element using the error correction code and the read address 7, to obtain a corrected data element, and to send the corrected data element to the CPU 11. By including the read address 7 from the CPU 11 in the ECC calculation and thus in the data correction (performed by the data checker 19'), it is ensured that the data read from the DRAM 13 is read from the correct address location.

When data elements are written to the DRAM 13 from the CPU 11, ECC checkbits are calculated for those data elements and appended to each data element and combinations of each data element and its corresponding ECC checkbits are stored in the DRAM 13. Since the data with ECC is now bigger than the original data, the data is stored in DRAM 13 at a translated address. This translation is done by the memory management apparatus 10, in particular the address translator 15, and is transparent to the CPU 11.

Figure 3:
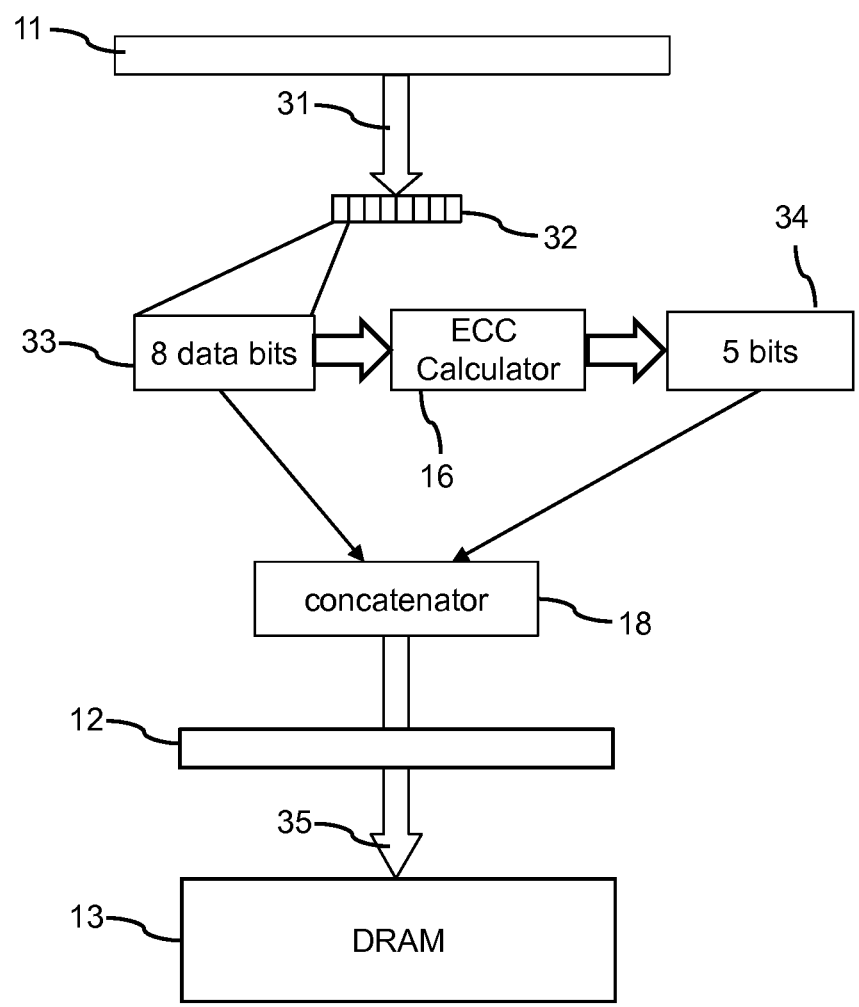
FIG. 3 schematically shows a first example of the flow of data between the CPU and the DRAM in case of a write operation.

FIG. 3 schematically shows a first example of the flow of data between the CPU 11 and the DRAM 13 in case of a write operation. The example of FIG. 3 is showing an implementation, which assumes that the individual data storage elements of the DRAM 13 have a width of 16 bits. Those skilled in the art will understand that the teaching of the present application is not limited to any specific storage element width but the skilled person is taught to apply the teaching to different storage element widths such as 8 bits, 32 bits, 64 bits and 128 bits. During a write operation of the CPU 11, multiple bytes are written in parallel and each byte (8 bits) of the write operation is handled separately. In this example the CPU 11 writes 64 bits of data via a 64-bit bus interface 31 to a 64-bit write buffer 32. The 64-bit write buffer 32 may be part of the DRAM management apparatus 10 shown in FIG. 1. The byte of data, see block 33, is used by the ECC calculator 16 to calculate the so-called ECC checkbits (5 bits in this example), see block 34. The byte of data 33 is concatenated with the ECC checkbits 34 plus padding bit(s) (3 padding bits in this example), to create a 16-bit data element 35 that is written to the DRAM 13 via the DRAM controller 12.

Figure 4:
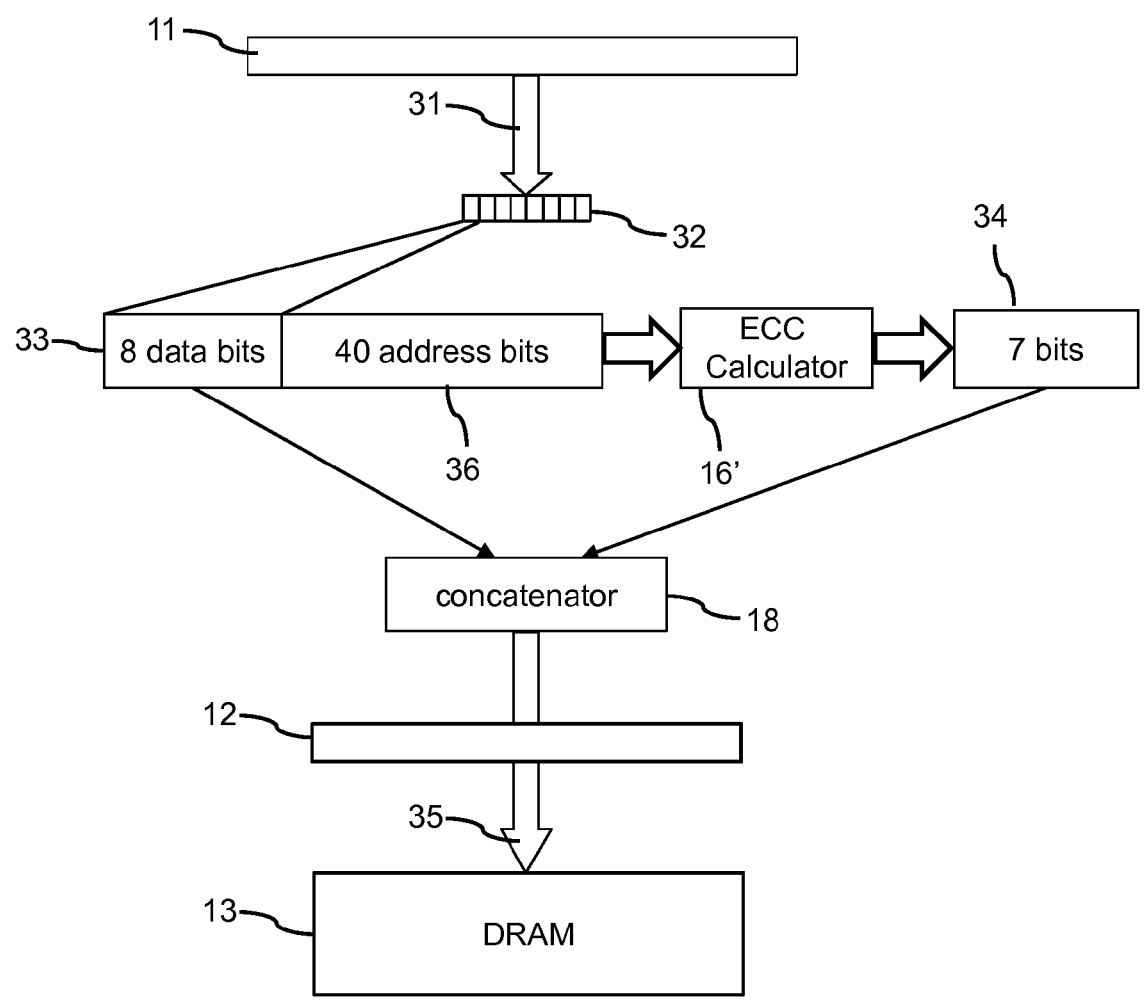
FIG. 4 schematically shows a second example of the flow of data between the CPU and the DRAM in case of a write operation.

FIG. 4 schematically shows a second example of the flow of data between the CPU 11 and the DRAM 13 in case of a write operation. As in the previous example, FIG. 4 is showing an implementation which assumes that the individual data storage elements of the DRAM 13 have a width of 16 bits and which should be understood as not limiting the teaching of the present application as mentioned above with reference to FIG. 3. Each byte of a write operation is handled separately. In this example the CPU 11 writes 64 bits of data via a 64-bit bus interface 31 to a 64-bit write buffer 32. The 64-bit write buffer 32 may be part of the DRAM management apparatus 10 shown in FIG. 1. The byte of data, see block 33, along with an address (herein a 40-bit address for the sake of illustration) of that byte, see block 36, is used by the ECC calculator 16' to calculate the ECC checkbits (7 bits), see block 34. As in FIG. 3, the byte of data 33 is concatenated with the ECC checkbits 34 plus padding bit(s) (1 padding bit in this example), to create a 16-bit data element 35 that is written to the DRAM 13 via the DRAM controller 12.

Figure 5:
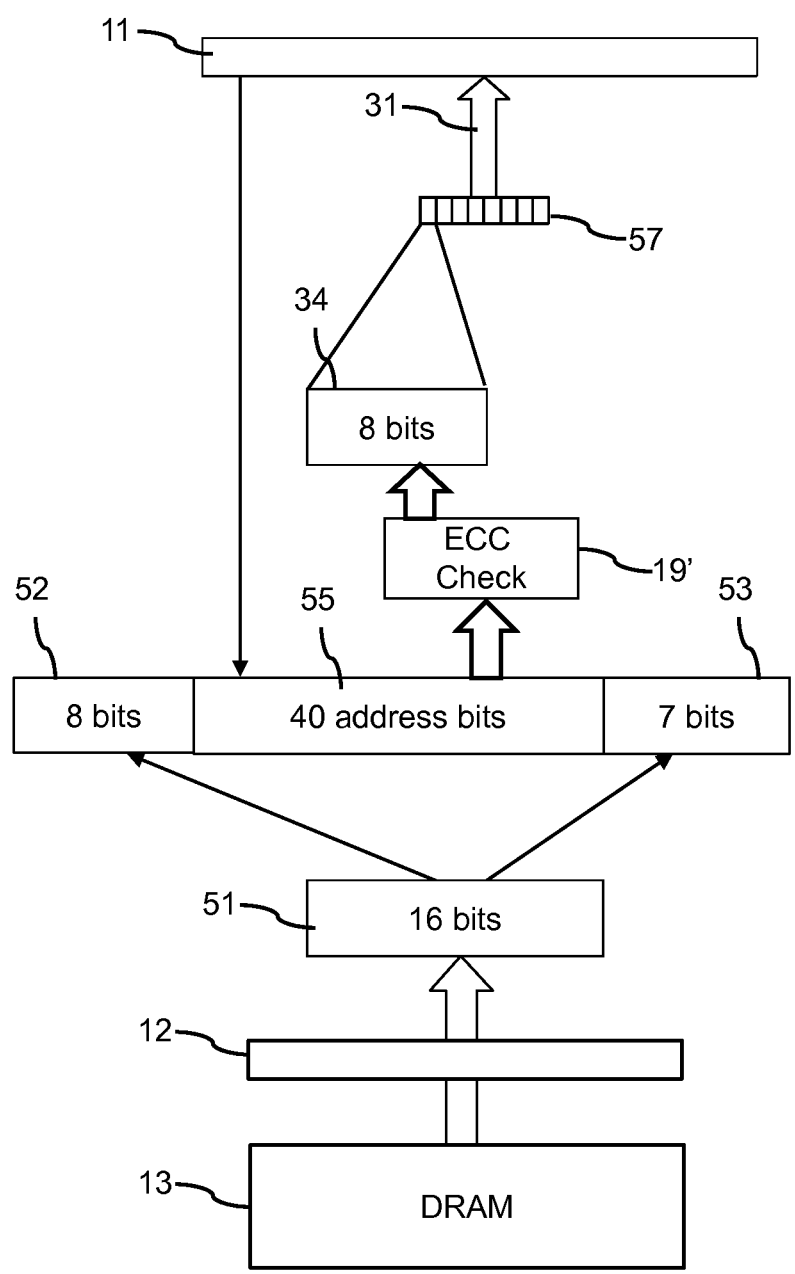
FIG. 5 schematically shows a third example of the flow of data between the CPU and the DRAM in case of a read operation.

FIG. 5 schematically shows a third example of the flow of data between the CPU 11 and the DRAM 13 in case of a read operation in correspondence with the above examples relating to write operations. A read request is received from the CPU 11 at the DRAM management apparatus 26, see FIG. 2, and 16-bit data 51 is fetched from the DRAM 13 for every byte of data requested by the CPU 11. The data 51 comprises an 8-bit data element 52 and the 7 checkbits 53. The 8-bit data element 52 and the 7 checkbits 53 are concatenated with the 40-bit requesting address 55 and then the ECC is checked by the data checker 19'. It is noted that the concatenating may differ from the example of FIG. 5. For example, the address bits may be included at the beginning, the middle or the end of the concatenated data input to the ECC checker 19'. A checked and possibly corrected 8 bits of data is returned by the data checker 19' as the requested data element to the CPU 11. In this example, the data checker 19' will move the possibly corrected data element into a 64-bit read buffer 57. Once the entire read buffer 57 is filled, it will be read as part of a 64-bit read data by the CPU 11.

In the previous three examples, the data is expanded by a factor of 2. So every byte from the CPU 11 occupies 2 bytes in the DRAM 13. During a CPU read operation, the data and ECC checkbits are read from the DRAM 13; the integrity of the data is checked and, if an error is detected, the read data is corrected on the basis of the ECC checkbits. The possibly corrected data is returned to the CPU 11. From the CPU's perspective, it appears that the DRAM 13 can be read out and written on the basis of the addressing scheme known to the CPU. In the memory management apparatus 10, in particular the concatenator 18, ECC checkbits are concatenated to data to be written to into the DRAM 13 without affecting the CPU 11 addressing scheme used by it.

In case a single bit error is detected in the data stored in the DRAM 13, the single bit error is automatically corrected by the data checker 19, 19' during a read operation. So the CPU 11 receives corrected data. In case a double bit error is detected in the data stored in the DRAM 13, the data checker 19, 19' indicates a memory error back to the CPU 11.

The examples of the apparatus 10, 26 described above enable detection of errors in a random access memory without any additional cost impact and without any additional requirements for the bus master 11. The use of ECC checkbits may also allow for more elaborate ECC schemes such as including the memory address in the ECC calculation, as discussed in the examples of FIGS. 4 and 5. Such an ECC scheme would allow detection of other DRAM faults, such as 'stuck at' or shorted address line, for example, a fault which causes that correct data are read from a wrong address. With the memory address encoded into the ECC checkbits during a write operation, on a read operation, not only must the data match the ECC checkbits but the read address must also match.

Figure 6:
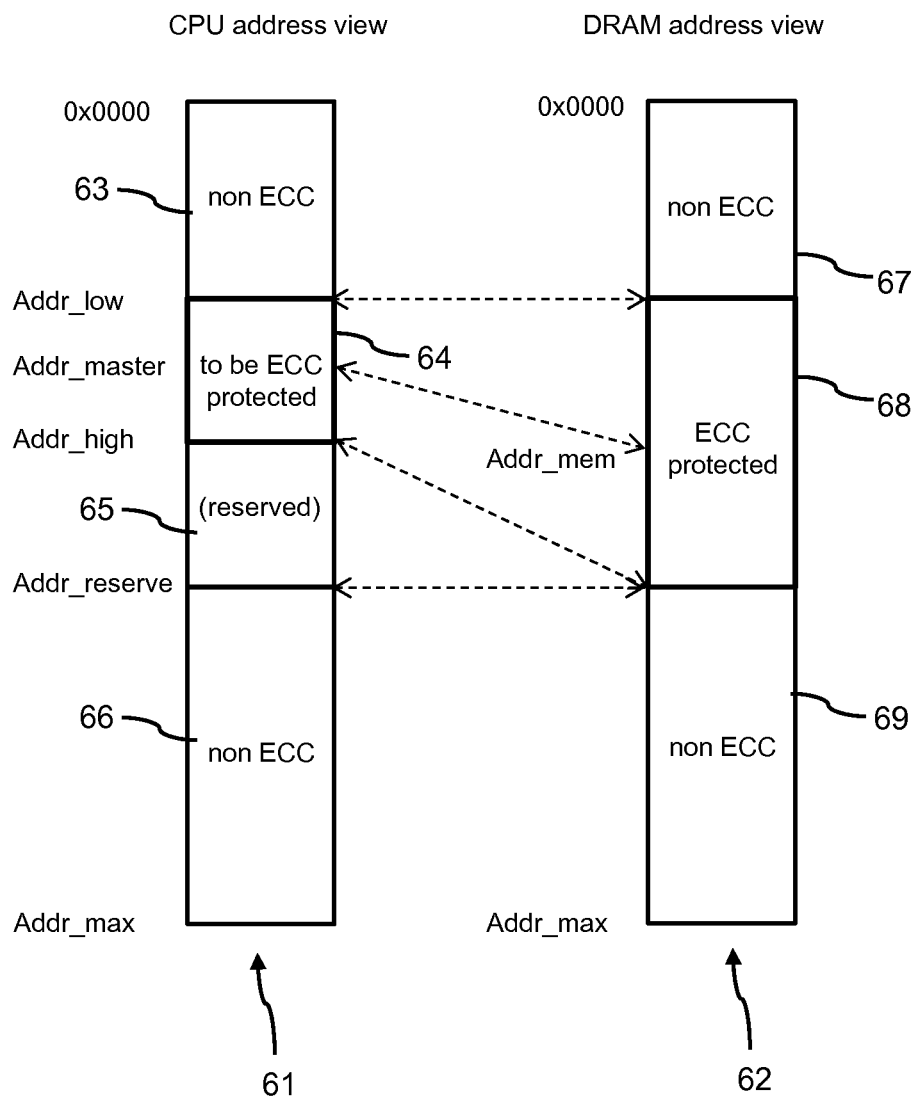
FIG. 6 schematically shows an example of a CPU address space which is transformed into a DRAM address space by the address translator of the exemplary apparatus of FIG. 1.

FIG. 6 schematically shows an example of a CPU address space 61 which is transformed into a DRAM address space 62 by the address translator 15 of the apparatus 10 of FIG. 1. At the left side of FIG. 6 the CPU address space 61 is shown. The CPU address space 61 comprises a first non-ECC protected region 63. Below that region an ECC protected region 64 is present followed by a reserved region of DRAM 65. At the bottom a second non-ECC protected region 66 is present. At the right side of FIG. 6 the DRAM address space 62 is shown. The DRAM address space 62 comprises a first non-ECC protected region 67. Below that region an ECC protected region 68 is present followed by a second non-ECC protected region 69.

The CPU 11 will see the 'normal' region of DRAM 64 followed by the 'reserved' region of DRAM 65. The 'normal' region of DRAM 64 may be understood as randomly accessible by the CPU 11 and the 'reserved' region thereof may be understood as inaccessible by the CPU 11. The address translator 15 translates the size of the CPU DRAM region 64 to the ECC protected region when data is read out from or written into the CPU DRAM region 64 of the DRAM 13 by the CPU 11.

In the example of FIG. 6, an address translation is executed only for the read and writes from/to the CPU DRAM region 64. Only this CPU DRAM region 64 is protected by ECC. A base address of the region within the CPU address space that is protected by ECC is named Addr_low. The top address of the CPU DRAM region 64 is named Addr_high. The address of an element of data within the CPU DRAM region 64 is designated as Addr_master.

The translated address in the DRAM address space 62 of the data element with address Addr_master in CPU address space 61 is called Addr_mem.

In an embodiment, the address translator 15 is arranged to translate a write address into a modified write address using a memory expansion factor K. This is the factor by which the data stored to DRAM is expanded by the addition of the ECC checkbits. The factor K may be calculated as follows:

$$K = (\text{Size\_of\_data} + \text{Size\_of\_ECC})/\text{Size\_of\_data} \quad (1)$$

wherein

Size_of_data: the bit-width of a data element to be coded, and

Size_of_ECC: the bit-width of ECC checkbits rounded up to the nearest $2^n$ number.

For example, if the width of a data element is 8 bits (Size_of_data) and the width of ECC checkbits is 7 bits, the latter will be rounded to 8 bits (Size_of_ECC) resulting in the value for the factor K=(8+8)/8=2.

The translation of the address of any element of data as seen by the CPU 11, to the address where the data is stored in DRAM is given by the following equation:

$$\text{Addr\_mem} = \text{Addr\_low} + K \cdot (\text{Addr\_master} - \text{Addr\_low}) \quad (2)$$

wherein

Addr_low: the base address of the protected region within the CPU address space, Addr_master: the address of a element of data within the protected region, and Addr_mem: the translated address in the DRAM address space of the element of data with address Addr_master in CPU address space.

The size of the region of the DRAM address space used to store data with ECC checkbits is larger than the size of the region of CPU data by the factor K. This results in a region of CPU address space that is 'reserved', for example see region 65. CPU writes to this reserved region may have unpredictable results that will depend on the specific implementation. For example an error may be returned by the memory management apparatus 10. Such error may indicate that the access to the 'reserved' CPU address space is not allowed.

Furthermore, from the above description, those skilled in the art will understand that the partitioning of the DRAM address space into one or more unprotected regions and one or more protected regions is configurable.

Figure 7:
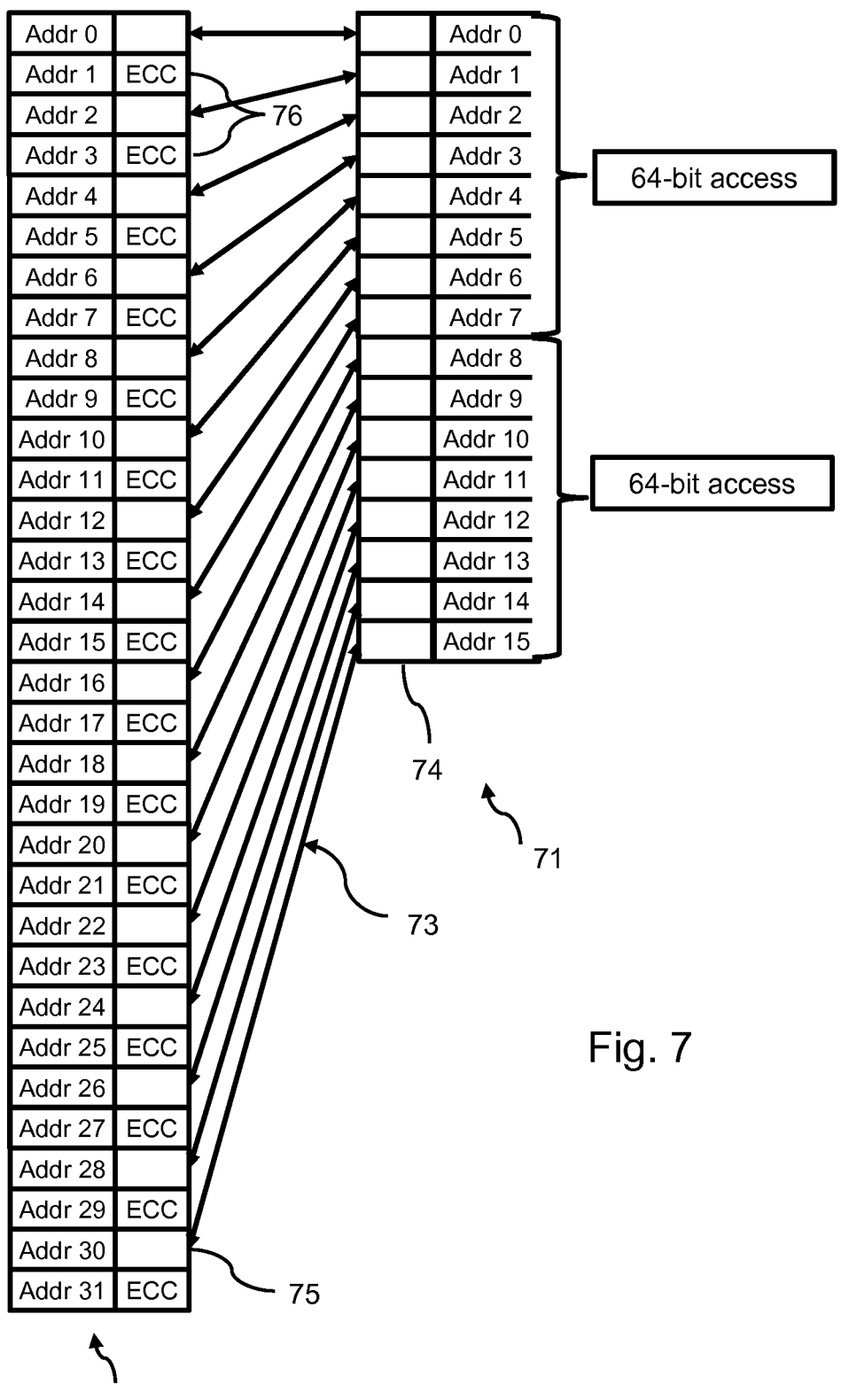
FIG. 7 schematically shows an example of part of a CPU space translated into part of a DRAM space.

FIG. 7 schematically shows an example of part of a CPU address space 71 translated into part of a DRAM address space 72. In this example the following assumptions are made. The size of each data element is 8 bits. The width of ECC checkbits is 7 bits (rounded up to 8 bits) resulting in an expansion factor K of 2. The CPU has 64-bit read/writes access to the DRAM 13. In FIG. 7, arrows 73 indicate where data elements 74 of the CPU address space 71 are stored in the DRAM address space 72 as data elements 75. As can be seen from FIG. 7, each of the data elements 75 is followed by ECC checkbits, which 8 bits due to rounding up. The CPU address space 71 continues from the master base address Addr_low to the master top address Addr_high, whereas the DRAM address space 71 continues from the memory base address Addr_low to the memory top address K·(Addr_high−Addr_low) with K=2.

Figure 8:
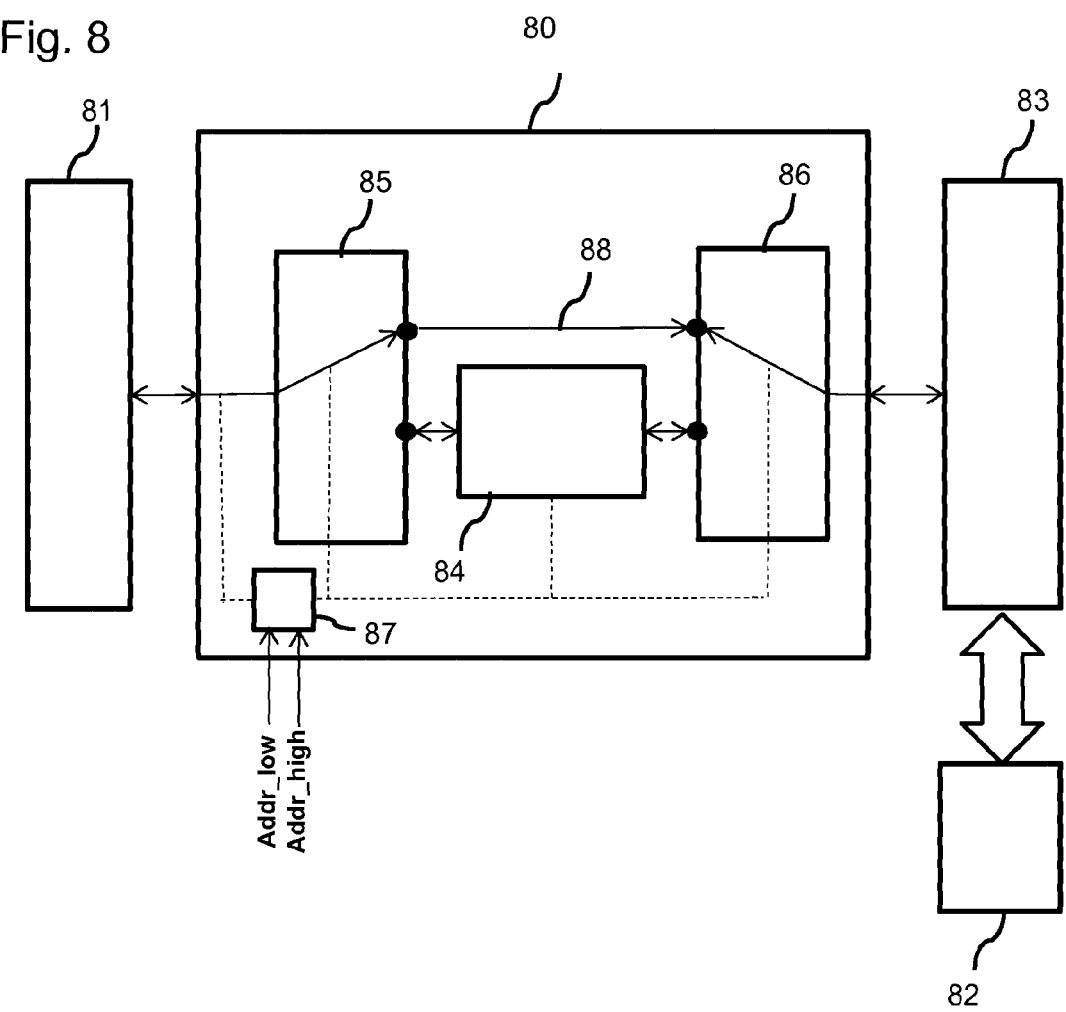
FIG. 8 schematically shows an example of a data storage interface device.

FIG. 8 schematically shows an example of a data storage interface device 80 for transfer of data elements between a bus master 81 and a memory controller 83 for a memory storage device 82. The data storage interface device 80 of FIG. 8 comprises an apparatus 84 which may be the apparatus 10 as described above. A bypass 88 is arranged in parallel to the apparatus 84 to forward read/write accesses from the bus master 81 directly to the memory controller 83. A first switch 85 is arranged to connect the bus master to the apparatus 84 in a first state, and connect the bus master to the bypass 88 in a second state. A second switch 86 is arranged to connect the apparatus 84 to the memory controller 83 in a first state, and connect the bypass 88 to the memory controller in a second state. The data storage interface device 80 further comprises a switch control unit 87 arranged to control the first switch 85 and the second switch 86.

In the example of FIG. 8 the CPU read/write accesses may be initiated by an ARM QOS (Quality-of-Service) system bus switch fabric 81. CPU writes may be 64 bits wide with a clock frequency of e.g., 533 MHz. The data is stored in the DRAM 82. The memory controller 83 may have a 64-bit wide 533 MHz port from the data storage interface device 80 and a 32-bit wide 533 MHz DDR port to the DRAM 82.

The apparatus 84 is arranged to generate and concatenate ECC checkbits to data elements, and to check read data received from the memory controller 83 using ECC checkbits incorporated in the read data. The apparatus 84 may comprise the address translator 15, the ECC calculator 16', the concatenator 18 and the data checker 19' as shown in FIGS. 1 and 2. It is noted that instead of the switch fabric 81 any other crossbar, switch fabric, network-on-chip, or bus master may be connected to the data storage interface device 80.

In an embodiment the selection of the bypass 88 is based on the address of the read/write request (Addr_master). Also referring to FIG. 6, the bypass may be activated by the switch control unit 87, if the following is true:

$$\text{Addr\_master} < \text{Addr\_low or Addr\_master} > \text{Addr\_high} \quad (3)$$

So by means of the data storage interface device 80 of FIG. 8, the CPU memory address space 61 may be transformed into the DRAM address space 62 as shown in FIG. 6.

The switch control unit 87 in conjunction with apparatus 84 may be arranged to perform error injection. Error injection may be performed to test that the apparatus is functioning to correct errors in the DRAM. This may be done by injecting errors into the data and/or ECC checkbits stored in DRAM; then reading that value back to verify the data is checked and corrected. For this purpose the switch control unit 87 may receive a command from the CPU to instruct the apparatus 84 to write some previously programmed data and ECC to the DRAM 82 at a previously programmed address. This data would contain some known error, such as 1 bit inverted from the correct value. The CPU could then perform a read operation from this address and check that the read data element was corrected.

The examples described with reference to FIGS. 3, 4 and 5 show ECC calculations on byte size elements. This has the advantage that it simplifies the interface to the CPU 11. Most CPUs have the capability to read and write different widths of data (e.g. 8 bits, 16 bits, 32 bits, etc.). With the ECC calculated on 8-bit data widths, it means that any access from the CPU 11 can be handled without the need to read-modify-write the DRAM 13 as would be required if the data write width is less than the ECC data size. It would also be possible to create an implementation that calculates the ECC checkbits on, for example, 32 bits of data. Such implementation would be suited for read/write requests of 32-bit data, but if the CPU wishes to write, for example, 16-bit data, then the apparatus reads 32 data bits plus ECC checkbits from the DRAM 13, replaces the target 16 bits of data with the new data from the CPU 11, calculates the ECC checkbits on this new 32-bit data, and then writes the 32 bits+ECC checkbits back to DRAM. This is referred to as read-modify-write operation.

In the examples above it has been assumed that the read/write requests are initiated by a CPU. It is noted that this invention is not limited to data storage by a CPU. It will work with any bus master that can initiate a read/write request including: DMA, DSP, hardware accelerators, debug memory access, cache controllers, communication interfaces, etc.

The description of this invention so far has exclusively described applications that use DRAM memory devices. It is not only limited to DRAM but could be used with any memory storage device, such as SRAM or flash device, or the bus interface to an ASIC (application specific integrated circuit) or FPGA (field-programmable gate array).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention. It is to be understood that the architectures depicted in the drawings are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

FIG. 9 shows exemplary flow charts of a method of managing data in a memory device. The method comprises an exemplary write access operation and an exemplary read access operation, see 900. The exemplary write access operation, see 920, comprises receiving a write request from a bus master, see 901. The write request comprises write input data and a write address. The method further comprises modifying the write address into a modified write address, see 902. The method further comprises generating an error correction code using the write input data and optionally, the write address, see 903. The method further comprises concatenating the write input data and the error correction code to obtain write output data, see 904. The method further comprises sending the write output data and the modified write address to the memory controller, see 905. The exemplary read access operation, see 930, further comprises receiving a read request from the bus master, see 906. The read request comprises a read address. The method further comprises modifying the read address into a modified read address, see 907. The method further comprises sending the modified read address to the memory controller, see 908. The method further comprises receiving read input data associated with the modified read address, from the memory controller, see 909. The read input data comprises data element and an error correction code. The method further comprises correcting the data element on the basis of the error correction code, to obtain a corrected data element, see 910. In particular, correcting the data element comprises using the read data and the error correction code to form a syndrome, which is then used to correct bit errors in the read data to obtain the corrected data element.

The method also further comprises sending the corrected data element to the bus master, see 911. In particular, the correction of read data detected as erroneous is performed on-the-fly during the read request from the CPU is pending to be completed.

Those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In the claims, any reference signs placed between parentheses shall not be construed as limiting the claim. The word 'comprising' does not exclude the presence of other elements or steps than those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. Apparatus for transfer of data elements between a bus master and a memory controller for a memory storage device, the apparatus comprising:
    an address translator arranged to receive a write address from the bus master, to modify the write address into a modified write address, and to send the modified write address to the memory controller,
    the address translator being further arranged to receive a read address from the bus master, to modify the read address into a modified read address, and to send the modified read address to the memory controller, and
    wherein the address translator is further arranged to modify the read or write address into the modified read or write address by multiplying a difference between the read or write address and a base address with an expansion factor K, where the expansion factor K is greater than one;
    an ECC calculator arranged to receive write input data associated with the write address from the bus master and to generate an error correction code on the basis of the write input data;
    a concatenator arranged to receive the write input data from the bus master, to receive the error correction code from the ECC calculator, to concatenate the write input data and the error correction code to obtain write output data, and to send the write output data to the memory controller; and
    a data checker arranged to receive read input data associated with the modified read address from the memory controller, wherein the read input data comprises a data element and an error correction code,
    the data checker being further arranged to correct the data element on the basis of the error correction code, to obtain a corrected data element, and to send the corrected data element to the bus master.

2. Apparatus according to claim 1, wherein the modified read or write address is calculated as follows:

Addr_mem=Addr_low +K·(Addr_master−Addr_low)

wherein Addr_mem: the modified read or write address,
    Addr_low: a base address of an ECC protected memory region,
    Addr_master: an address of an element of data within the ECC protected region.

3. Apparatus according to claim 1 wherein the expansion factor K is calculated as follows:

K=(Size_of_data+Size_of_ECC)/Size_of_data, wherein Size_of_data: a size of a data element to be coded, and
    Size_of$_{13}$ ECC: a size of the error correction code in bits rounded up to the nearest 2n number, n being an integer.

4. Apparatus according to claim 1, wherein the ECC calculator is further arranged to receive a write address and the write input data associated with the write address from the bus master and to generate the error correction code on the basis of the write input data and the write address.

5. Apparatus according to claim 1, wherein the bus master is a CPU and the apparatus is part of the memory controller.

6. Apparatus according to claim 1, wherein the size of each data element is 8 bits, 16 bits, 32 bits, 64 bits or 128 bits.

7. Apparatus according to claim 1, wherein the data checker is arranged to return a memory error back to the bus master if a double-bit error or uncorrectable error is detected in the data stored in the memory storage device.

8. Data storage interface device for transfer of data elements between a bus master and a memory controller for a memory storage device, the data storage interface device comprising:
    an apparatus according to claim 1,
    a bypass arranged in parallel to the apparatus to forward read/write accesses from the bus master directly to the memory controller;
    a first switch arranged to connect the bus master to the apparatus in a first state, and connect the bus master to the bypass in a second state;
    a second switch arranged to connect the apparatus to the memory controller in a first state, and connect the bypass to the memory controller in a second state; and
    a switch control unit arranged to control the first switch and the second switch.

9. Data storage interface device according to claim 8, wherein the switch control unit is further arranged to control the first switch and the second switch depending on at least a base address and an top address defining a memory space region providing error correction coding and an address of a data read or write request from the bus master.

10. Data storage interface device according to claim 8, wherein the switch control unit is further arranged to switch the first and second switch to connect the bypass, if the following is met:

Addr_master<Addr_low or Addr_master>Addr_high, wherein Addr_master: an address of a data element within an ECC protected region, Addr_low: a base address 5 of the ECC protected region, Addr_high: a top address of the ECC protected region.

11. Method of managing data into a memory device, wherein a write access from a bus master to the memory device comprises:
- receiving a write request from the bus master, the write request comprising write input data and a write address,
- modifying the write address into a modified write address,
- generating an error correction code on the basis of the write input data,
- concatenating the write input data and the error correction code to obtain write output data, and
- sending the write output data and the modified write address to the memory controller, wherein a read access from a bus master to the memory device comprises:
- receiving a read request from the bus master, the read request comprising a read address,
- modifying the read address into a modified read address,
- sending the modified read address to the memory controller,
- receiving read input data associated with the modified read address, from the memory controller, the read input data comprising data element and an error correction code,
- correcting the data element on the basis of the error correction code, to obtain corrected data element, and
- sending the corrected data element to the bus master, and wherein the modifying of the read or write address comprises multiplying a difference between the read or write address and a base address with an expansion factor K, where the expansion factor K is greater than one.

12. Method according to claim 11, wherein the modified write address is calculated as follows:

$$Addr\_mem = Addr\_low + K \cdot (Addr\_master - Addr\_low),$$

wherein Addr_mem: the modified read or write address,

Addr_low: a base address of an ECC protected memory region,

Addr_master: an address of an element of data within the ECC protected region.

13. Method according to claim 11, wherein the expansion factor K is calculated as follows:

$$K = (Size\_of\_data + Size\_of\_ECC)/Size\_of\_data,$$

wherein Size_of_data: a size of a data element to be coded, and

Size_of_ECC: a size of the error correction code in bits rounded up to the nearest 2n number, n being an integer.

* * * * *